(12) United States Patent
Hausman, Jr. et al.

(10) Patent No.: US 11,863,103 B2
(45) Date of Patent: Jan. 2, 2024

(54) STALL PROTECTION FOR A MOTORIZED WINDOW TREATMENT

(71) Applicant: Lutron Technology Company LLC, Coopersburg, PA (US)

(72) Inventors: Donald F. Hausman, Jr., New Tripoli, PA (US); Chen Ming Wu, Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/069,513

(22) Filed: Dec. 21, 2022

(65) Prior Publication Data
US 2023/0119168 A1  Apr. 20, 2023

Related U.S. Application Data

(63) Continuation of application No. 17/645,614, filed on Dec. 22, 2021, now Pat. No. 11,558,002, which is a
(Continued)

(51) Int. Cl.
*H02P 29/032* (2016.01)
*H02P 7/03* (2016.01)
(Continued)

(52) U.S. Cl.
CPC .............. *H02P 29/032* (2016.02); *E06B 9/70* (2013.01); *E06B 9/82* (2013.01); *H02P 7/04* (2016.02);
(Continued)

(58) Field of Classification Search
CPC ........ H02P 29/032; H02P 7/04; H02P 29/024; E06B 9/70; E06B 9/82; E06B 2009/6818
See application file for complete search history.

(56) References Cited

U.S. PATENT DOCUMENTS

2008/0258666 A1\* 10/2008 Carmen .................... E06B 9/68
318/470
2013/0293988 A1  11/2013 Li et al.
(Continued)

FOREIGN PATENT DOCUMENTS

EP  0783072 A1  7/1997

OTHER PUBLICATIONS

International Preliminary Report on Patentability and Written Opinion, in corresponding International Patent Application No. PCT/US2019/044019, dated Feb. 11, 2021.
(Continued)

*Primary Examiner* — Zoheb S Imtiaz
(74) *Attorney, Agent, or Firm* — Duane Morris LLP

(57) ABSTRACT

A motor drive unit for driving a motor of a motorized window treatment may comprise software-based and hardware-based implementations of a process for detecting and resolving a stall condition in the motor, where the hardware-based implementation is configured to reduce power delivered to the motor if the software-based implementation has not first reduced the power to the motor. A control circuit may detect a stall condition of the motor, and reduce the power delivered to the motor after a first period of time from first detecting the stall condition. The motor drive unit may comprise a stall prevention circuit configured to reduce the power delivered to the motor after a second period of time (e.g., longer than the first period of time) from determining that a rotational sensing circuit is not generating a sensor signal while the control circuit is generating a drive signal to rotate the motor.

20 Claims, 4 Drawing Sheets

Related U.S. Application Data continuation of application No. 16/525,650, filed on Jul. 30, 2019, now Pat. No. 11,233,478.

(60) Provisional application No. 62/711,981, filed on Jul. 30, 2018.

(51) Int. Cl.
*E06B 9/82* (2006.01)
*E06B 9/70* (2006.01)
*H02P 29/024* (2016.01)
*E06B 9/68* (2006.01)

(52) U.S. Cl.
CPC .... *H02P 29/024* (2013.01); *E06B 2009/6818* (2013.01)

(56) References Cited

U.S. PATENT DOCUMENTS

2015/0357949 A1* 12/2015 Marlia ............... G05B 19/4061
   318/490
2020/0076336 A1   3/2020 Miyako et al.

OTHER PUBLICATIONS

Office Action dated Apr. 13, 2022 for corresponding Canadian patent application No. 3,017,116; 3 pages.

* cited by examiner

STALL PROTECTION FOR A MOTORIZED WINDOW TREATMENT

CROSS-REFERENCE TO RELATED APPLICATIONS

This application is a continuation of U.S. patent application Ser. No. 17/645,614, filed Dec. 22, 2021 as a continuation of U.S. patent application Ser. No. 16/525,650, filed Jul. 30, 2019, which claims the benefit of U.S. Provisional Patent Application No. 62/711,981, filed Jul. 30, 2018, the entire disclosures of which are hereby incorporated by reference.

BACKGROUND

Motorized window treatments, such as motorized roller shades, may include a flexible material, such as a shade fabric, and a motor drive unit for controlling a motor to adjust a position of the shade fabric (e.g., a position of a bottom edge of the shade fabric). For example, the motor drive unit of a motorized roller shade may be located inside of a roller tube around which the shade fabric is wrapped. The motor drive unit may rotate the roller tube in two opposing angular directions to adjust the position of the shade fabric. The motor drive unit may comprise a control circuit (e.g., a microprocessor) and a rotational position sensing circuit (e.g., a Hall-effect sensor circuit) for monitoring a present angular position of the roller tube in order to keep track of a present position of the shade fabric between a closed position (e.g., a fully-closed position) and an open position (e.g., a fully-open position).

If the shade fabric become stuck on an object near the motorized window treatment and/or is otherwise prevented from moving, the motor may stall. During a stall condition, the motor may draw a very large amount of current and overheat, which may cause damage to the motor and/or the motor drive unit of the motorized window treatment. The control circuit may be configured to detect the stall condition, for example, by detecting that the motor is not rotating (e.g., in response to the rotational position sensing circuit while the control circuit is actively driving the motor). In response to detecting the stall condition, the control circuit may slow down and/or stop the motor to prevent the motor from overheating. However, if the control circuit is prevented from detecting the stall condition and/or from removing the stall condition (e.g., as a result of a fault in the electrical circuitry), the motor and/or the motor drive circuit may overheat and be damaged.

SUMMARY

As described herein, a motor drive unit for driving a motor of a motorized window treatment may comprise both software-based and hardware-based implementations of a process for detecting and resolving a stall condition in the motor, where the hardware-based implementation may be configured to reduce the power delivered to the motor if the software-based implementation has not first reduced the power to the motor. For example, the motorized window treatment may be a motorized roller shade having a flexible shade fabric, and a roller tube that windingly receives the shade fabric and may be rotated to adjust a position of the shade fabric in response to the motor drive unit driving the motor.

The motor drive unit may comprise a motor drive circuit configured to control power delivered to the motor, a rotational sensing circuit configured to generate a sensor signal that indicates rotation of the motor, and a control circuit configured to generate a drive signal to control the motor drive circuit to control the power delivered to the motor. The control circuit may detect a stall condition of the motor, and reduce the power delivered to the motor after a first period of time from first detecting the stall condition (e.g., a software-based implementation). The motor drive unit may further comprise a stall prevention circuit configured to reduce the power delivered to the motor after a second period of time from first determining that the rotational sensing circuit is not generating the sensor signal while the control circuit is generating the drive signal to rotate the motor (e.g., a hardware-based implementation). The second period of time may be longer than the first period of time, such that the control circuit typically reduces the power delivered to the motor before the stall protection circuit, and the stall protection circuit reduces the power delivered to the motor in case the control circuit is unable to reduce the power delivered to the motor.

In addition, the stall prevention circuit may be configured to reduce the power delivered to the motor by stopping the motor at the end of the second period of time. The stall prevention circuit may be configured to latch the motor in the stopped state at the end of the second period of time. The control circuit may cease generating the drive signal in response to receiving a command to stop the motor, and the stall prevention circuit unlatch the motor in response to the control circuit ceasing to generate the drive signal. The stall prevention circuit may also unlatch the motor in response to a power cycle of the motor drive unit.

DETAILED DESCRIPTION

Figure 1:
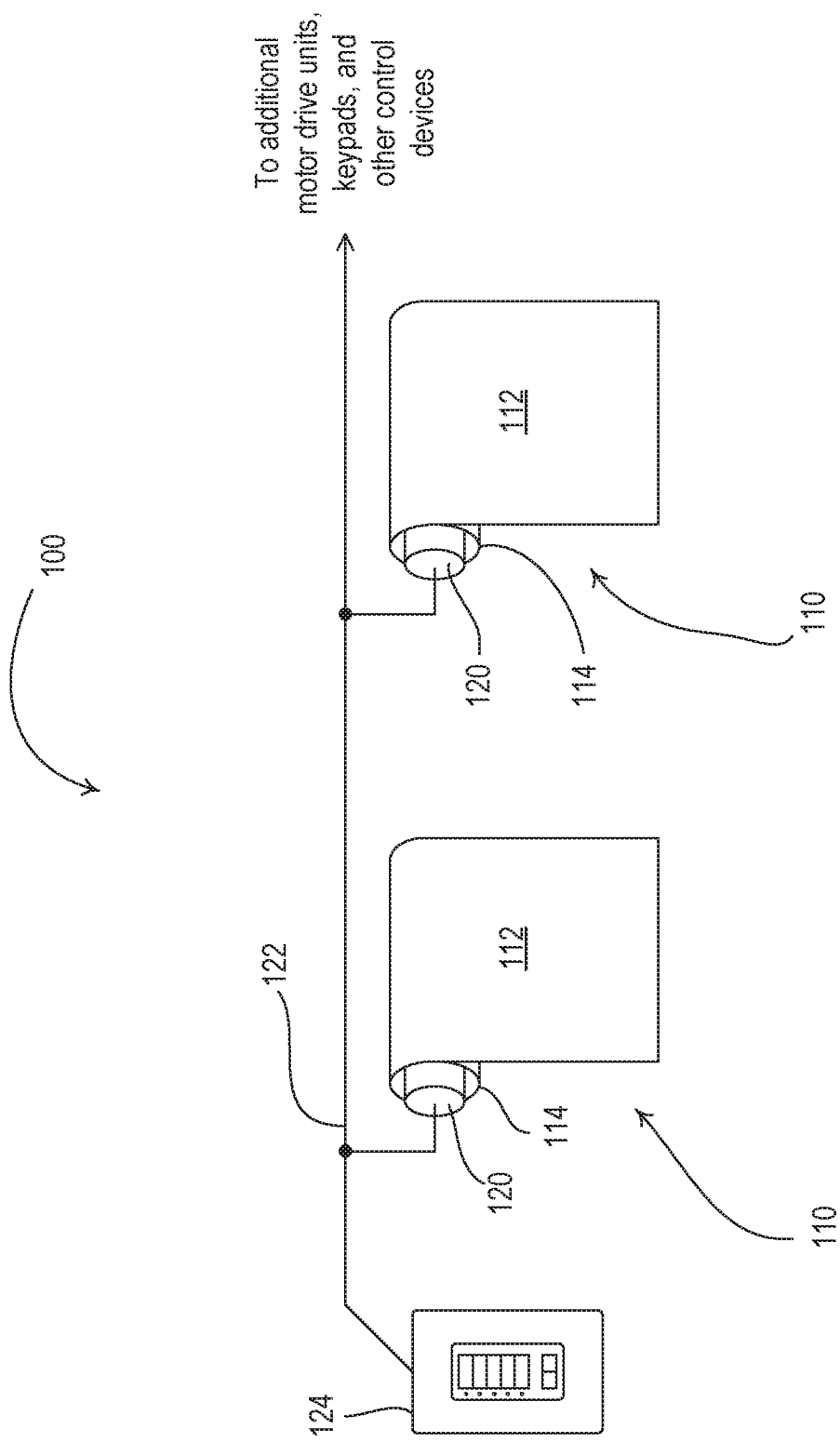
FIG. 1 is a simplified block diagram of an example motorized window treatment system.

FIG. 1 is a simplified block diagram of an example motorized window treatment system 100. The motorized window treatment system 100 may comprise a plurality of motorized window treatments, for example, motorized roller shades 110 as shown in FIG. 1. Each motorized roller shade 110 may comprise a respective flexible shade fabric 112 rotatably supported by a respective roller tube 114. Each motorized window shade 110 may comprise a respective motor drive unit 120 that may be located inside of the roller tube 114. The motor drive units 120 may each rotate the respective roller tube 114 to adjust a present position $P_{PRES}$ of the shade fabric 112 between a fully-open position $P_{OPEN}$ and a fully-closed position $P_{CLOSED}$. The motor drive units 120 may be coupled to a communication link 122 and may receive commands from a keypad 124 and/or other control device across the communication link. The communication link 122 may comprise a wired communication link or a wireless communication link, such as, for example, a radio-frequency (RF) communication link or an infrared (IR) communication link.

Figure 2:
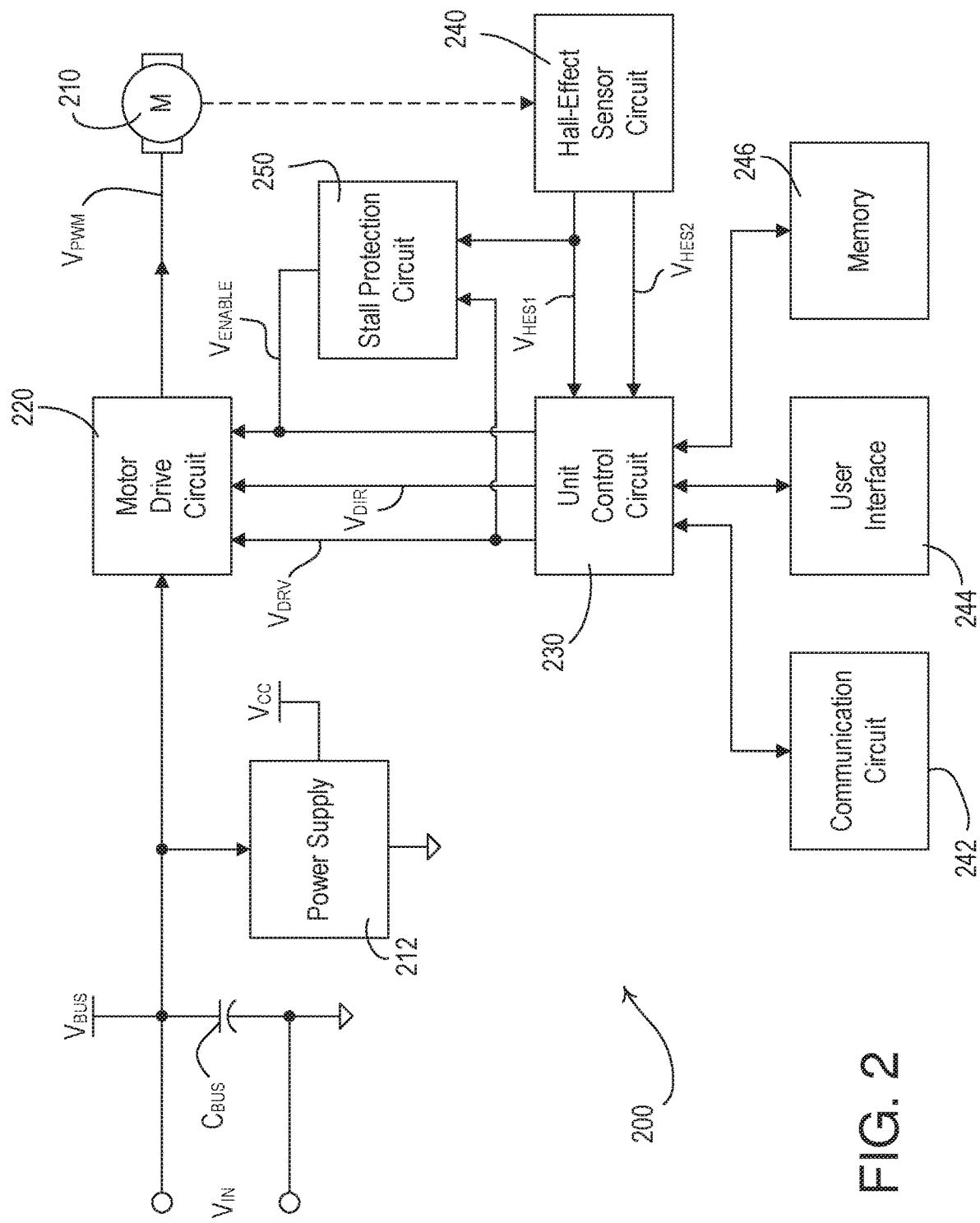
FIG. 2 is a simplified block diagram of an example motor drive unit of a motorized window treatment.

FIG. 2 is a simplified block diagram of an example motor drive unit 200 of a motorized window treatment. The motor drive unit 200 may comprise a motor 210 (e.g., a direct-current (DC) motor) that may be coupled to a roller tube of the motorized window treatment for rotating the roller tube for raising and lowering a flexible material (e.g., a shade fabric). The motor drive unit 200 may comprise a motor drive circuit 220 (e.g., an H-bridge drive circuit) that may receive a bus voltage $V_{BUS}$ and generate a pulse-width modulated (PWM) voltage $V_{PWM}$ for driving the motor 210. The bus voltage $V_{BUS}$ may be produced across a bus capacitor $C_{BUS}$. The motor drive unit 200 may comprise a power supply 212 that may receive the bus voltage $V_{BUS}$ and generate a supply voltage $V_{CC}$ (e.g., approximately 3.3 V) for powering the low-voltage circuitry of the motor drive unit. The motor drive unit 200 may be configured to receive an input voltage $V_{IN}$ from, for example, an external power supply, such as a direct-current (DC) supply and/or an alternating-current (AC) supply. Additionally or alternatively, the motor drive unit 200 may be powered by one or more batteries and/or a photovoltaic power source, such as a solar cell. While not shown in FIG. 2, the motor drive unit 200 may also comprise a rectifier circuit and/or a power converter circuit for receiving the input voltage $V_{IN}$ and generating the bus voltage $V_{BUS}$ across the bus capacitor $C_{BUS}$.

The motor drive unit 200 may comprise a unit control circuit 230 (e.g., a primary control circuit) for controlling the operation of the motor 210. The unit control circuit 230 may comprise, for example, a microprocessor, a programmable logic device (PLD), a microcontroller, an application specific integrated circuit (ASIC), a field-programmable gate array (FPGA), or any suitable processing device or control circuit. The unit control circuit 230 may be configured to generate a drive signal $V_{DRV}$ for controlling the motor drive circuit 220 to control the rotational speed of the motor 210. For example, the drive signal $V_{DRV}$ may comprise a pulse-width modulated signal, and the rotational speed of the motor 210 may be dependent upon a duty cycle of the pulse-width modulated signal. In addition, the unit control circuit 230 may be configured to generate a direction signal Vow for controlling the motor drive circuit 220 to control the direction of rotation of the motor 210 and an enable signal $V_{ENABLE}$ for enabling and disabling the motor drive circuit 220. The unit control circuit 230 may be configured to control the motor 210 to adjust a present position $P_{PRES}$ of the shade fabric of the motorized window treatment between a fully-open position $P_{OPEN}$ and a fully-closed position $P_{CLOSED}$.

The motor drive unit 200 may include a rotational position sensor, e.g., a Hall effect sensor (HES) circuit 240, which may be configured to generate two Hall effect sensor (HES) signals $V_{HES1}$, $V_{HES2}$ that may indicate the rotational position and direction of rotation of the motor 210. The HES circuit 240 may comprise two internal sensing circuits for generating the respective HES signals $V_{HES1}$, $V_{HES2}$ in response to a magnet that may be attached to a drive shaft of the motor. The magnet may be a circular magnet having alternating north and south pole regions, for example. For example, the magnet may have two opposing north poles and two opposing south poles, such that each sensing circuit of the HES circuit 240 is passed by two north poles and two south poles during a full rotation of the drive shaft of the motor. Each sensing circuit of the HES circuit 240 may drive the respective HES signal $V_{HES1}$, $V_{HES2}$ to a high state when the sensing circuit is near a north pole of the magnet and to a low state when the sensing circuit is near a south pole. The unit control circuit 230 may be configured to determine that the motor 210 is rotating in response to the HES signals $V_{HES1}$, $V_{HES2}$ generated by the HES circuit 240. In addition, the unit control circuit 230 may be configured to determine the rotational position and direction of rotation of the motor 210 in response to the HES signals $V_{HES1}$, $V_{HES2}$.

The motor drive unit 200 may include a communication circuit 242 that allows the unit control circuit 230 to transmit and receive communication signals, e.g., wired communication signals and/or wireless communication signals, such as radio-frequency (RF) signals. The motor drive unit 200 may further comprise a user interface 244 having one or more buttons that allow a user to provide inputs to the control circuit 230 during setup and configuration of the motorized window treatment. The unit control circuit 230 may be configured to control the motor 210 to control the movement of the covering material in response to a shade movement command received from the communication signals received via the communication circuit 242 or the user inputs from the buttons of the user interface 244. The user interface 244 may also comprise a visual display, e.g., one one or more light-emitting diodes (LEDs), which may be illuminated by the unit control circuit 230 to provide feedback to the user of the motorized window treatment system. The unit control circuit 230 may be coupled to a memory 246 (e.g., a non-volatile memory) for storage of the present position $P_{PRES}$ of the shade fabric and/or the limits (e.g., the fully-open position $P_{OPEN}$ and the fully-closed position $P_{CLOSED}$).

While controlling the motor drive circuit 220 to drive the motor 210, the unit control circuit 230 may be configured to reduce the power delivered to the motor 210 (e.g., by stopping the motor) in the event of a stall condition. When a stall condition occurs, the motor 210 may stop rotating and the HES circuit 240 may stop generating the HES signals $V_{HES1}$, $V_{HES2}$ even though the unit control circuit 230 is actively attempting to rotate the motor by continuing to generate the drive signal $V_{DRV}$.

The unit control circuit 230 may be configured to monitor one or both of the HES signals $V_{HES1}$, $V_{HES2}$ to detect a stall condition. For example, the unit control circuit 230 may be configured to detect that the motor 210 may have stalled if the HES circuit 240 is not generating one or both of the HES signals $V_{HES1}$, $V_{HES2}$ while the unit control circuit 230 is generating the drive signal $V_{DRV}$ for controlling the motor drive circuit 220 to drive the motor 210. The unit control circuit 230 may be configured to reduce the power delivered to the motor 210 (e.g., by stopping the motor) after a first amount of time (e.g., one second) from first detecting a stall condition. For example, the unit control circuit 230 may be configured to stop the motor in response to detecting a stall condition by disabling the motor drive circuit 220 (e.g., by driving the magnitude of the enable signal $V_{ENABLE}$ low towards circuit common). The unit control circuit 230 may provide a software-based implementation of a process for detecting and resolving a stall condition in the motor 210.

The motor drive unit 200 may further comprise a stall protection circuit 250 (e.g., a hardware stall protection circuit) that may be configured to turn off the motor 210 in the event of a stall condition if the unit control circuit 230 is unable to stop the motor in response to the stall condition. The stall protection circuit 250 may receive the drive signal $V_{DRV}$ from the unit control circuit 230 and at least one of the HES signals $V_{HES1}$, $V_{HES2}$ from the HES circuit 240 (e.g., the first HES signal $V_{HES1}$ as shown in FIG. 2). The stall protection circuit 250 may be coupled to the enable signal $V_{ENABLE}$ that is generated by the unit control circuit 230 and received by the motor drive circuit 220 for disabling the motor drive circuit and thus stopping the motor in response to detecting a stall condition. For example, the stall protection circuit 250 may be configured to override the unit control circuit 230 and pull the enable signal $V_{ENABLE}$ down towards circuit common if the stall protection circuit is receiving the drive signal $V_{DRV}$, but not receiving the first HES signal $V_{HES1}$. The stall protection circuit 250 may be configured to drive the enable signal $V_{ENABLE}$ low after a second amount of time (e.g., approximately 2-4 seconds) from the time when the first HES signal $V_{HES1}$ is not being generated while the drive signal $V_{DRV}$ is being generated. The stall protection circuit 250 may operate slower than the unit control circuit 230 when detecting a stall condition, such that the unit control circuit 230 may typically stop the motor 210 in the event of a stall condition after the first predetermined amount of time. However, if the unit control circuit 230 is unable to stop the motor in the event of a stall condition, the stall protection circuit 250 may operate to stop the motor after the second predetermined amount of time. The stall protection circuit 250 may provide a hardware-based implementation of a process for detecting and resolving a stall condition in the motor 210.

The stall protection circuit 250 may be configured to latch the enable signal $V_{ENABLE}$ in the low state in response to detecting a stall condition. When the unit control circuit 230 stops driving the motor 210 after detecting a stall condition, the motor may relax and rotate a small amount in a rotational direction that is opposite the rotational direction in which the motor was being driven. This relaxing of the motor 210 may cause the HES circuit 240 to generate either or both of the HES signals $V_{HES1}$, $V_{HES2}$, which could potentially cause the stall protection circuit 250 to cease pulling the enable signal $V_{ENABLE}$ down towards circuit common to disable the motor drive circuit 220. Therefore, the stall protection circuit 250 may latch the enable signal $V_{ENABLE}$ in the low state after detecting a stall condition, such that the stall protection circuit may not stop pulling the enable signal $V_{ENABLE}$ low when the motor 210 relaxes. To unlatch the stall protection circuit 250, the unit control circuit 230 may stop generating the drive signal $V_{DR}$ (e.g., in response to receiving a stop command via the communication circuit 242 and/or an actuation of one of the buttons of the user interface 244).

Figure 3:
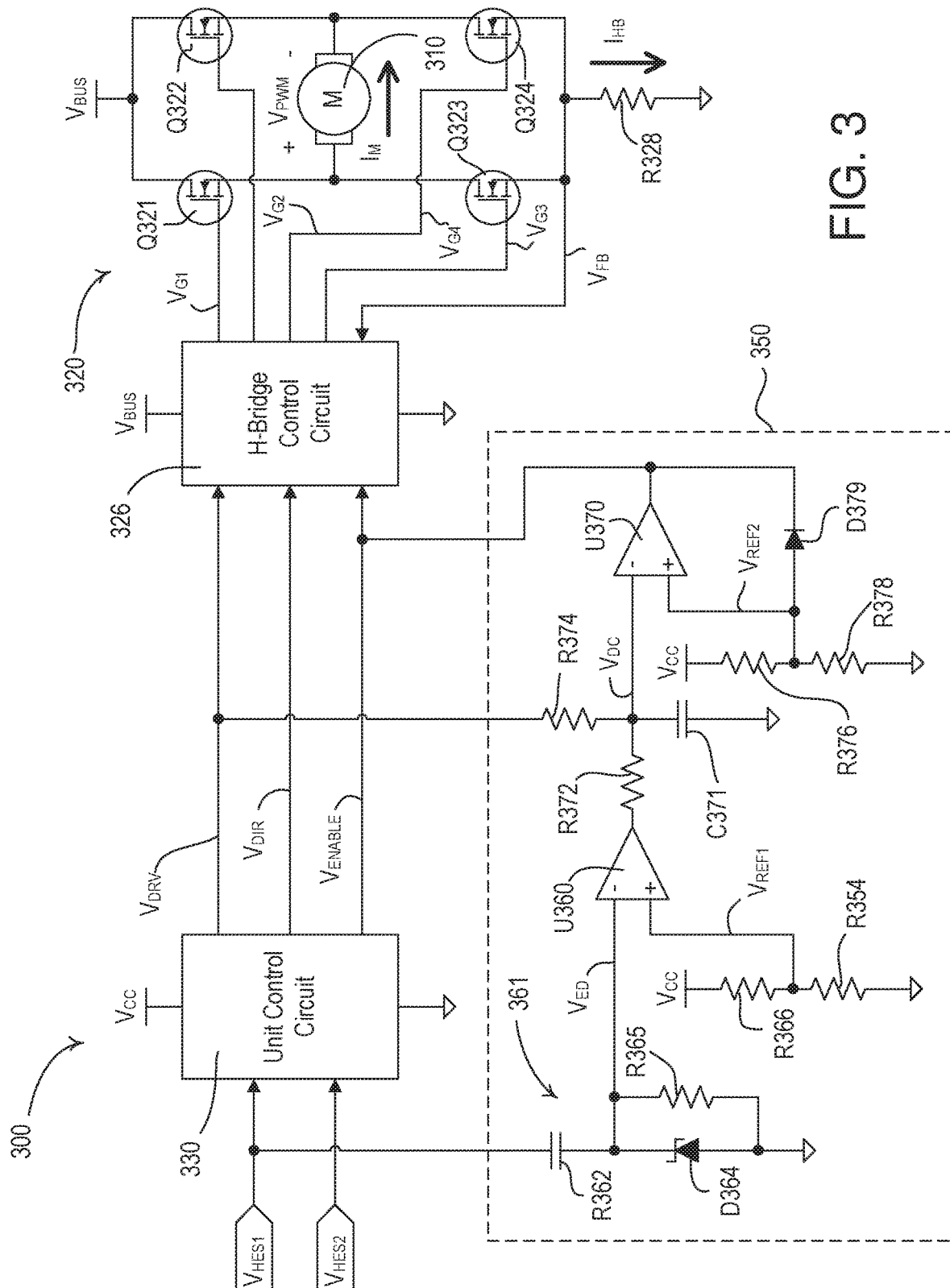
FIG. 3 is a simplified partial schematic diagram of an example motor drive unit of a motorized window treatment

FIG. 3 is a simplified partial schematic diagram of an example motor drive unit 300 of a motorized window treatment (e.g., the motor drive unit 200 shown in FIG. 2). The motor drive unit 300 may comprise a motor 310 and an H-bridge drive circuit 320 configured to receive a bus voltage $V_{BUS}$ and control the motor 310. The motor drive unit 300 may comprise a unit control circuit 330 configured to control the operation of the H-bridge drive circuit 320 to control the rotational speed and direction of the motor 310.

The unit control circuit 330 may be configured to generate a drive signal $V_{DRV}$ for controlling the rotational speed of the motor 310, a direction signal $V_{DIR}$ for controlling the direction of rotation of the motor, and an enable signal $V_{ENABLE}$ for enabling and disabling the H-bridge drive circuit 320. The unit control circuit 330 may receive two HES signals $V_{HES1}$, $V_{HES2}$ from a HES circuit (e.g., the HES circuit 140) and may be configured to determine the state of the motor 310 (e.g., if the motor is rotating), the rotational speed of the motor, and/or the direction of rotation of the motor in response to the HES signals $V_{HES1}$, $V_{HES2}$.

The H-bridge drive circuit 320 may comprise four switching transistors, such as field-effect transistors (FETs) Q321, Q322, Q323, Q324, and an H-bridge control circuit 326. For example, the H-bridge control circuit 326 may comprise an integrated circuit (IC). The H-bridge control circuit 326 may generate gate signals $V_{G1}$, $V_{G2}$, $V_{G3}$, $V_{G4}$ that are received by gates of the respective FETs Q321, Q322, Q323, Q324 for rendering the FETs conductive and non-conductive. The motor 310 may be coupled between the junction of the FETs Q321, Q323 and the junction of the FETs Q322, Q324. The H-bridge control circuit 326 may render two of the FETs Q321, Q322, Q323, Q324 conductive and may pulse-width modulate (PWM) at least one of the gate signals $V_{G1}$, $V_{G2}$, $V_{G3}$, $V_{G4}$ (e.g., one of the FETs that is conductive) to generate a pulse-width modulated (PWM) signal $V_{PWM}$ across the motor 310 and conduct a motor current $I_M$ through the motor 310 as shown in FIG. 3. When the FETs Q321, Q324 are conductive, a positive voltage having a magnitude approximately equal to the bus voltage $V_{BUS}$ may be coupled across the motor 310 and the motor may rotate in a first direction. When the FETs Q322, Q323 are conductive, a negative voltage having a magnitude approximately equal to the bus voltage $V_{BUS}$ may be coupled across the motor 310 and the motor may rotate in a second direction.

The H-bridge control circuit 326 may adjust a duty cycle of the PWM signal $V_{PWM}$ to adjust the rotational speed of the motor 310 (e.g., by pulse-width modulating at least one of the FETs that are being controlled to be conductive as described above). The H-bridge control circuit 326 may determine which FETs Q321, Q322, Q323, Q324 to control to set the direction of the motor 310 in response to the direction signal $V_{DIR}$ generated by the unit control circuit 330. The H-bridge control circuit 326 may determine the duty cycle for the PWM signal $V_{PWM}$ in response to the drive signal $V_{DRV}$ generated by the unit control circuit 330.

The H-bridge drive circuit 320 may comprise a feedback resistor R328 (e.g., having a resistance of approximately 50 mΩ) that may be coupled between the junction of the FETs Q323, Q324 and circuit common. The feedback resistor 328 may conduct a half-bridge current $I_{HB}$ (e.g., which may indicate the magnitude of the motor current $I_M$ through the motor 310). The feedback resistor 328 may generate a feedback signal $V_{FB}$ that may be representative of the magnitude of the motor current $I_M$ and may be received by the H-bridge control circuit 326. The H-bridge control circuit 326 may provide an overcurrent protection (OCP) feature in response to the magnitude of the feedback signal $V_{FB}$ to prevent overcurrent conditions in the FETs Q321, Q322, Q323, Q324. For example, the H-bridge control circuit 326 may render all of the FETs Q321, Q322, Q323, Q324 non-conductive if the magnitude of the feedback signal $V_{FB}$ exceeds a first overcurrent threshold $V_{OCP1}$ (e.g., approximately 1 volt). The H-bridge control circuit 326 may disable the operation of the FETs Q321, Q322, Q323, Q324 for a retry time period $T_{RETRY}$ (e.g., approximately 3 milliseconds) after detecting the overcurrent condition. While not shown in FIG. 3, the H-bridge control circuit 326 may also receive signals that indicate the magnitudes of voltages developed across the respective FETs Q321, Q322, Q323, Q324. The H-bridge control circuit 326 may configured to detect an overcurrent condition in the FETs Q321, Q322, Q323, Q324 if the magnitude of any of the voltages across the FETs exceeds a second overcurrent threshold $V_{OCP2}$ (e.g., approximately 1 volt).

The unit control circuit 330 may be configured to detect a stall condition by monitoring one or both of the HES signals $V_{HES1}$, $V_{HES2}$ For example, the unit control circuit 330 may be configured to detect that the motor 310 may have stalled if the HES circuit is not generating one or both of the HES signals $V_{HES1}$, $V_{HES2}$ while the unit control circuit 330 is generating the drive signal $V_{DRV}$ for controlling the motor drive circuit 320 to drive the motor 310. In response to detecting a stall condition, the unit control circuit 330 may be configured to reduce the power delivered to the motor 310 (e.g., by stopping the motor) after a first amount of time (e.g., one second) from first detecting the stall condition. For example, the unit control circuit 330 may be configured to stop the motor in response to detecting a stall condition by driving the magnitude of the enable signal $V_{ENABLE}$ low towards circuit common to by disable the motor drive circuit 320. The overcurrent protection feature of the H-bridge control circuit 326 may prevent the motor 310 and the FETs Q321, Q322, Q323, Q324 from being damaged during the stall condition before the unit control circuit 330 stops the motor at the end of the first amount of time.

The motor drive unit 300 may comprise a stall protection circuit 350 that may comprise two comparators U360, U370. The stall protection circuit 350 may include an edge detect circuit 361 that may receive one of the HES signals $V_{HES1}$, $V_{HES2}$ (e.g., the first HES signal $V_{HES1}$ as shown in FIG. 3) and may generate an edge detect signal $V_{ED}$ that indicates the edges (e.g., the rising edges) of the first HES signal $V_{HES1}$. The edge detect circuit 361 may comprise a capacitor C362 (e.g., having a capacitance of capacitance of approximately 0.1 µF), a diode D364 (e.g., a Schottky diode), and a resistor R365 (e.g., having a resistance of approximately 100 kΩ). When the magnitude of the first HES signal $V_{HES1}$ transitions from low to high, the capacitor C362 may conduct current through the resistor R365, thus generating a pulse (e.g., a positive-polarity pulse) in the edge detect signal $V_{ED}$. When the magnitude of the first HES signal $V_{HES1}$ transitions from high to low, the capacitor C362 may conduct a pulse of current in the opposite direction through the diode D364 (e.g., without generating a pulse in the edge detect signal $V_{ED}$).

The negative input of the first comparator U360 may receive the edge detect signal $V_{ED}$ generated by the edge detect circuit 361, and the positive input may receive a first reference voltage $V_{REF1}$, which may be generated by a resistive divider circuit having resistors R366, R368. For example, the resistor R366 may have a resistance of approximately 100 kΩ and the resistor R368 may have a resistance of approximately 10 kΩ, such that the first reference voltage $V_{REF1}$ may have a magnitude of approximately 0.3 V. The output of the first comparator U360 may have an open collector configuration and may be coupled to a capacitor C371 (e.g., having a capacitance of approximately 2 µF) through a resistor R372 (e.g., having a resistance of approximately 100 kΩ). The capacitor C371 may also be coupled to the drive signal $V_{DRV}$ through a resistor R374 (e.g., having a resistance of approximately 1 Me). When the magnitude of the edge detect signal $V_{ED}$ is less than the magnitude of the first reference voltage $V_{REF1}$, the capacitor C371 may charge from the drive signal $V_{DRV}$ through the resistor R374, such that a DC voltage $V_{DC}$ is generated across the capacitor C371. When the magnitude of the edge detect signal $V_{ED}$ is greater than the magnitude of the first reference voltage $V_{REF1}$, the first comparator U360 may drive the output low to discharge the capacitor C371 through the resistor R372 (e.g., to approximately zero volts).

The negative input of the second comparator U370 may receive the DC voltage $V_{DC}$ across the capacitor C371, and the positive input may receive a second reference voltage $V_{REF2}$, which may be generated by a resistive divider circuit having resistors R376, R378. For example, the resistor R376 may have a resistance of approximately 10 kΩ and the resistor R378 may have a resistance of approximately 90.9 kΩ, such that the second reference voltage $V_{REF1}$ may have a magnitude of approximately 3 V (e.g., equal to approximately 90% of the magnitude of the supply voltage $V_{CC}$). The output of the second comparator U370 may have an open collector configuration and may be coupled to the enable signal $V_{ENABLE}$ that is generated by the unit control circuit 330 and received by the H-bridge control circuit 326. The junction of the resistors R376, R378 (e.g., that generates the second reference voltage $V_{REF2}$) may be coupled to the output of the second comparator U370 through a diode D379. When the comparator U370 drives the output low, the magnitude of the second reference voltage $V_{REF2}$ may be decreased to approximately the forward voltage drop of the diode D379 (e.g., approximately 0.7 V).

When the unit control circuit 330 is generating the drive signal $V_{DR}$v and the motor is rotating correctly, the HES circuit will generate the HES signals $V_{HES1}$, $V_{HES2}$. When the first HES signal $V_{HES1}$ is driven high towards the supply voltage $V_{CC}$, the edge detect circuit 361 may generate a pulse in the edge detect signal $V_{ED}$, which may exceed the first reference voltage $V_{REF1}$. As a result, the first comparator U360 may pull the output low to discharge the capacitor C371 and drive the DC voltage Vic down to approximately zero volts. When the magnitude of the edge detect signal $V_{ED}$ is low (e.g., at approximately circuit common), the capacitor C371 may charge from the drive signal $V_{DRV}$. Since the first HES signal $V_{HES1}$ is a periodic signal, the capacitor C371 may periodically discharge to approximately zero volts when the first HES signal $V_{HES1}$ is driven from low to high. As a result, the magnitude of the DC voltage Vic across the capacitor C371 may not be able to increase above the second reference voltage $V_{REF2}$, which allows the unit control circuit 330 to have full control of the enable signal $V_{ENABLE}$ and the H-bridge drive circuit 320.

If the motor stalls, the HES circuit may stop generating the HES signals $V_{HES1}$, $V_{HES2}$. When the first HES signal $V_{HES1}$ is not present at the negative input of the first comparator U360, the capacitor C371 may charge from the drive signal $V_{DRV}$ through the resistor R374 (e.g., without periodically discharging). When the magnitude of the DC voltage $V_{DC}$ across the capacitor C371 rises above the second reference voltage $V_{REF2}$, the second comparator U370 may drive the output low, thus controlling the magnitude of the enable signal $V_{ENABLE}$ to approximately zero volts and disabling the H-bridge control circuit 326. The capacitance of the capacitor C371 and the resistance of the resistor R374 may be sized such that the magnitude of the DC voltage across the capacitor C371 may exceed the second reference voltage $V_{REF2}$ after a second amount of time (e.g., approximately 2-4 seconds) after the HES circuit stops generating the first HES signal $V_{HES1}$. The overcurrent protection feature of the H-bridge control circuit 326 may prevent the motor 310 and the FETs Q321, Q322, Q323, Q324 from being damaged during the stall condition before the second comparator U370 disables the motor drive circuit 320 at the end of the second amount of time. Since the drive signal $V_{DRV}$ may have a magnitude approximately equal to the supply voltage $V_{CC}$ when driven high and the magnitude of the second reference voltage may be equal to approximately 90% of the supply voltage, the H-bridge control circuit 326 may be disabled when first HES signal $V_{HES1}$ is not being generated and the duty cycle of the drive signal $V_{DRV}$ exceeds 90%.

After the second comparator U370 drives the output low to disable the H-bridge control circuit 326, the magnitude of the second reference voltage $V_{REF2}$ may be pulled down to approximately 0.7 volts through the diode D379, which may latch the H-bridge control circuit 326 in the disabled state by preventing the second comparator circuit U370 letting go of the enable signal VEN. The H-bridge control circuit may be unlatched from the disabled state if the unit control circuit 330 stops the motor 310 (e.g., in response to receiving a stop command and/or a user input) or if the unit control circuit 330 is reset (e.g., in response to a power cycle of the motor drive unit 300).

Figure 4:
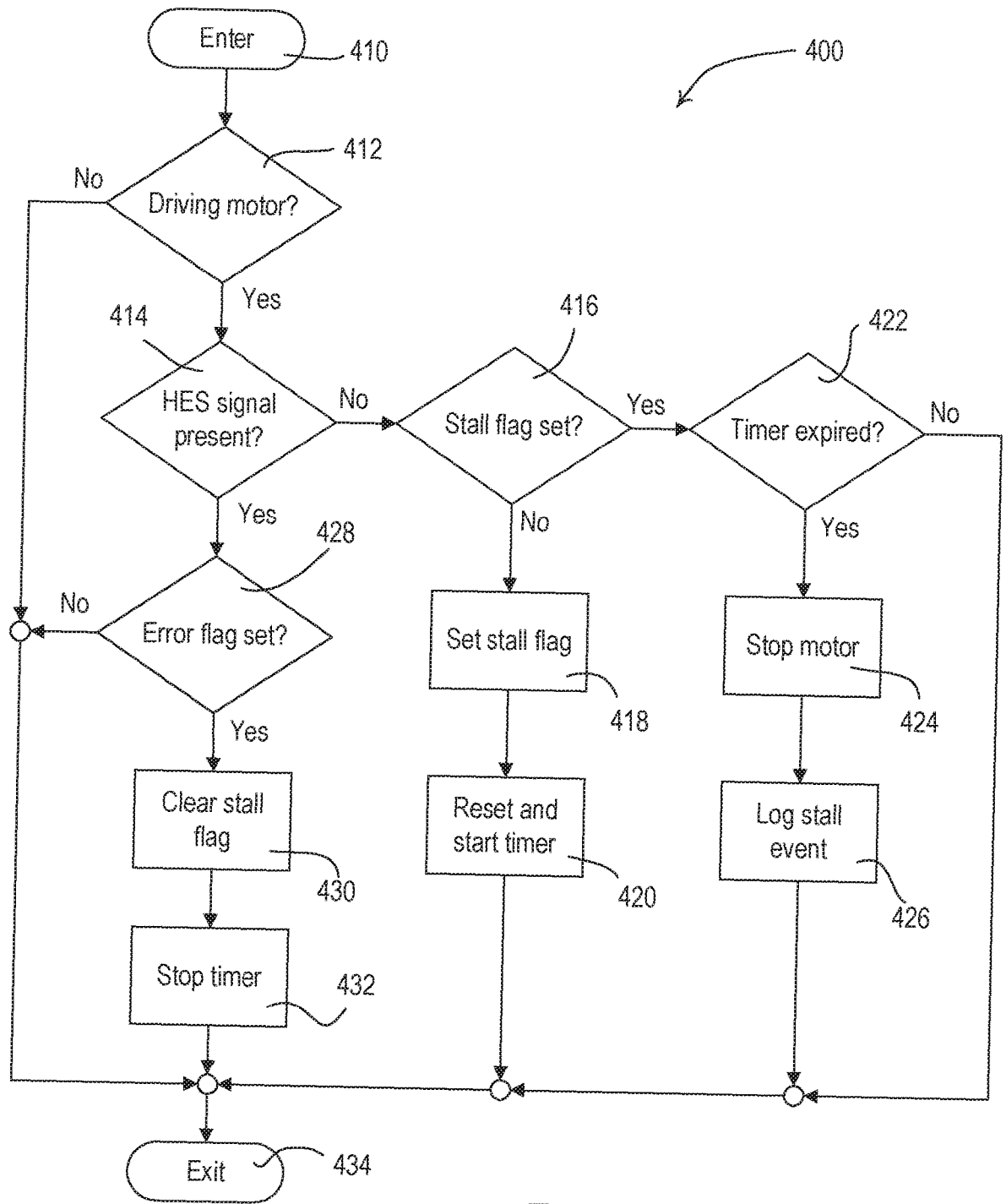
FIG. 4 is a simplified flowchart of a stall protection procedure that may be executed by a control circuit of a motor drive unit

FIG. 4 is a simplified flowchart of a stall protection procedure 400 that may be executed by a control circuit of a motor drive unit (e.g., the unit control circuit 230 of the motor drive unit 200 and/or the unit control circuit 330 of the motor drive unit 300). For example, the stall protection procedure 400 may be executed periodically at 410. If the control circuit is not presently driving the motor at 412, the stall protection procedure 400 may simply exit at 434. If the control circuit is presently driving the motor at 412, but a HES signal is not present at 414, the control circuit may detect a potential stall condition. If a stall flag is not presently set at 416, the control circuit may set the stall flag at 418 and then reset and start a timer at 420, before the stall protection procedure 400 exits at 434. The timer may be used to delay shutting down the motor for a period of time (e.g., approximately one second) after first detecting that the HES signal is not present while driving the motor. For example, the period of time may be sufficiently longer than the rate at which the stall protection procedure 400 is executed, such that the stall protection procedure 400 may be executed a number of times before the time expires. If the stall flag is set at 416, but the timer has not expired at 422, the stall protection procedure 400 simply exits at 434. When the timer has expired at 422, the control circuit may stop the motor at 424 and log a stall event in memory at 426, before the stall protection circuit exits at 434. When the HES signal is present at 414 and the error flag is set at 428, the control circuit may clear the stall flag at 430 and stop the timer at 432, before the stall protection procedure 400 exits.

What is claimed is:

1. A motor drive unit for driving a motor of a motorized window treatment, the motor drive unit comprising:
   a motor drive circuit configured to control power delivered to the motor;
   a rotational sensing circuit configured to generate a sensor signal that indicates rotation of the motor;
   a control circuit configured to generate a drive signal for controlling the motor drive circuit to control the power delivered to the motor, the control circuit configured to detect a stall condition of the motor, and to control the motor drive circuit to stop driving the motor after a first period of time from detecting the stall condition; and
   a stall prevention circuit configured to detect the stall condition by determining that the rotational sensing circuit is not generating the sensor signal while the control circuit is generating the drive signal to rotate the motor, the stall protection circuit configured to control the motor drive circuit to stop driving the motor after a second period of time from detecting the stall condition, the second period of time longer than the first period of time.

2. The motor drive unit of claim 1, wherein the stall prevention circuit is configured to latch the motor in a stopped state at the end of the second period of time.

3. The motor drive unit of claim 2, wherein the stall prevention circuit is configured to unlatch the motor from the stopped state in response to the control circuit ceasing to generate the drive signal.

4. The motor drive unit of claim 3, wherein the control circuit is configured to cease generating the drive signal in response to receiving a command to stop the motor.

5. The motor drive unit of claim 2, wherein the stall prevention circuit is configured to unlatch the motor from the stopped state in response to a power cycle of the motor drive unit.

6. The motor drive unit of claim 1, wherein the stall prevention circuit is configured to receive the drive signal and the sensor signal.

7. The motor drive unit of claim 6, wherein the control circuit is configured to generate an enable signal that is received by the motor drive circuit for enabling and disabling the motor drive circuit.

8. The motor drive unit of claim 7, wherein the stall prevention circuit comprises:
   a capacitor coupled to the drive signal through a resistor for producing a DC voltage across the capacitor;
   an edge detect circuit configured to receive the sensor signal and generate an edge detect signal that indicates edges of the sensor signal;
   a first comparator having a positive input coupled to receive a first reference voltage, a negative input coupled to receive the edge detect signal, and an output configured to discharge the capacitor at one or more of the edges of the sensor signal;
   a second comparator having a positive input coupled to receive a second reference voltage, a negative input coupled to receive the DC voltage across the capacitor, and an output configured to control the magnitude of the enable signal;
   wherein the first comparator is configured to control the DC voltage across the capacitor to approximately zero volts when the rotational sensing circuit is generating the sensor signal, the second comparator configured to control the enable signal to disable the motor drive circuit when the rotational sensing circuit is not generating the sensor signal and the magnitude of the DC voltage across the capacitor exceeds the second reference voltage.

9. The motor drive unit of claim 8, wherein the stall prevention circuit further comprises a diode coupled between the positive input and the output of the second comparator for decreasing the magnitude of the second reference voltage when the output is driven low to latch the motor drive circuit in the disabled state.

10. The motor drive unit of claim 7, wherein the stall prevention circuit is configured to cause the motor drive unit to stop the motor by controlling the enable signal to disable the motor drive circuit.

11. The motor drive unit of claim 1, wherein the control circuit is configured to receive the sensor signal and to detect the stall condition in response to determining that the rotational sensing circuit is not generating the sensor signal while the control circuit is generating the drive signal to rotate the motor.

12. The motor drive unit of claim 11, wherein the control circuit is configured to wait for the first period of time after first detecting the stall condition before stopping the motor.

13. The motor drive unit of claim 11, wherein the control circuit is configured to generate an enable signal that is received by the motor drive circuit for enabling and disabling the motor drive circuit, the control circuit configured to cause the motor drive unit to stop the motor by controlling the enable signal to disable the motor drive circuit.

14. A motorized window treatment comprising:
a flexible material; and
a motor drive unit comprising:
- a motor drive circuit configured to drive a motor for adjusting a position of the flexible material;
- a rotational sensing circuit configured to generate a sensor signal that indicates rotation of the motor;
- a control circuit configured to generate a drive signal for controlling the motor drive circuit to control the power delivered to the motor, the control circuit configured to detect a stall condition of the motor, and to control the motor drive circuit to stop the motor after a first period of time from detecting the stall condition; and
- a stall prevention circuit configured to detect the stall condition by determining that the rotational sensing circuit is not generating the sensor signal while the control circuit is generating the drive signal to rotate the motor, the stall protection circuit configured to control the motor drive circuit to stop driving the motor after a second period of time from detecting the stall condition, the second period of time longer than the first period of time.

15. The motorized window treatment of claim 14, wherein the stall prevention circuit is configured to latch the motor in a stopped state at the end of the second period of time.

16. The motorized window treatment of claim 15, wherein the stall prevention circuit is configured to unlatch the motor from the stopped state in response to the control circuit ceasing to generate the drive signal.

17. The motorized window treatment of claim 16, wherein the control circuit is configured to cease generating the drive signal in response to receiving a command to stop the motor.

18. The motorized window treatment of claim 15, wherein the stall prevention circuit is configured to unlatch the motor from the stopped state in response to a power cycle of the motor drive unit.

19. The motorized window treatment of claim 14, wherein the control circuit is configured to generate an enable signal that is received by the motor drive circuit for enabling and disabling the motor drive circuit; and
  wherein the stall prevention circuit and the control circuit are both configured to cause the motor drive unit to stop the motor by controlling the enable signal to disable the motor drive circuit.

20. The motorized window treatment of claim 14, wherein the flexible material comprises a shade fabric and the motorized window treatment further comprises a roller tube windingly receiving the shade fabric, the motor drive circuit configured to drive the motor to rotate the roller tube and adjust the position of the shade fabric.

* * * * *